US008839406B2

(12) United States Patent
Kim

(10) Patent No.: US 8,839,406 B2
(45) Date of Patent: Sep. 16, 2014

(54) METHOD AND APPARATUS FOR CONTROLLING BLOCKING OF SERVICE ATTACK BY USING ACCESS CONTROL LIST

(71) Applicant: Electronics and Telecommunications Research Institute, Daejeon (KR)

(72) Inventor: Dae Won Kim, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 29 days.

(21) Appl. No.: 13/674,497

(22) Filed: Nov. 12, 2012

(65) Prior Publication Data

US 2014/0075537 A1    Mar. 13, 2014

(30) Foreign Application Priority Data

Sep. 13, 2012 (KR) .......................... 10-2012-0101484

(51) Int. Cl.
*G06F 21/00* (2013.01)
(52) U.S. Cl.
USPC ................... 726/13; 726/11; 726/12; 726/14; 726/26
(58) Field of Classification Search
USPC .......................................................... 726/13
See application file for complete search history.

(56) References Cited

U.S. PATENT DOCUMENTS

| 7,200,865 | B1* | 4/2007 | Roscoe et al. ................... 726/12 |
| 2001/0036185 | A1* | 11/2001 | Dempo ......................... 370/392 |
| 2002/0051466 | A1* | 5/2002 | Bruckman ..................... 370/474 |
| 2003/0076850 | A1* | 4/2003 | Jason, Jr. ...................... 370/414 |
| 2003/0188015 | A1* | 10/2003 | Lee et al. ...................... 709/238 |
| 2004/0075537 | A1* | 4/2004 | Quigley et al. ............. 340/425.5 |
| 2004/0193906 | A1* | 9/2004 | Dar et al. ..................... 713/200 |
| 2006/0282893 | A1* | 12/2006 | Wu et al. ........................ 726/23 |
| 2008/0282338 | A1* | 11/2008 | Beer ............................... 726/12 |
| 2008/0282339 | A1* | 11/2008 | Nakae et al. .................... 726/13 |
| 2010/0060738 | A1 | 3/2010 | Kataoka et al. |
| 2010/0259609 | A1 | 10/2010 | Takahashi |
| 2011/0035795 | A1* | 2/2011 | Shi ................................. 726/13 |
| 2011/0099622 | A1* | 4/2011 | Lee et al. ........................ 726/13 |
| 2011/0107412 | A1* | 5/2011 | Lee et al. ........................ 726/11 |
| 2012/0324575 | A1* | 12/2012 | Choi et al. ...................... 726/23 |

FOREIGN PATENT DOCUMENTS

| JP | 2007-129481 | 5/2007 |
| KR | 10-2011-0043371 | 4/2011 |
| KR | 10-2011-0049282 | 5/2011 |
| KR | 2011049282 A * | 5/2011 |

* cited by examiner

*Primary Examiner* — William Powers
*Assistant Examiner* — Yonas Bayou
(74) *Attorney, Agent, or Firm* — Staas & Halsey LLP

(57) ABSTRACT

An attack blocking control method uses an access control list (ACL). The method includes investigating the ACL if a packet is input, and checking whether or not the packet is registered in the ACL, comparing a current time count value with a blocking time of the packet if the packet is determined to be registered in the ACL. Further, the method includes increasing the number of blocking times of the packet by 1 if the current time count value is smaller than or equal to the blocking time. Further, the method includes automatically renewing the blocking time, and removing registration information for the packet from the ACL if the current time count value is greater than the blocking time.

13 Claims, 4 Drawing Sheets

METHOD AND APPARATUS FOR CONTROLLING BLOCKING OF SERVICE ATTACK BY USING ACCESS CONTROL LIST

RELATED APPLICATIONS(S)

This application claims the benefit of Korean Patent Application No. 10-2012-0101484, filed on Sep. 13, 2012, which is hereby incorporated by references as if fully set forth herein.

FIELD OF THE INVENTION

The present invention relates to a technology of controlling the blocking of a service attack using an access control list (ACL), and more particularly, to an apparatus and method for controlling the blocking of a service attack using an ACL, which is suitable for cancelling the blocking or automatically extending a blocking time based on a difference between a transmission interval of an attack packet and that of a normal packet with respect to input packets, the input packets being provided after information on a packet that is detected as an attack packet and thus to be blocked is registered in an ACL, in a security system connected to a network.

BACKGROUND OF THE INVENTION

As they are well-known, most of host-based and network-based security systems connected to a network include a hardware-based or software-based access control list (ACL). In a process of controlling the blocking of a service attack based on the ACL, information on a packet that is detected or supposed to be an attack packet, e.g., an Internet protocol (IP) address, a port number, protocol information, and so on, is registered (or stored) in the ACL, and then, when an input packet corresponding to the attack packet is provided, a function of blocking the input packet is performed.

Herein, in registering or deleting information on a packet that is to be blocked in or from the ACL, if a user manually registers or deletes the packet information, a big problem does not occur. However, if the packet information is automatically registered or deleted, a problem may occur in determining a timing of deleting the packet information registered in the ACL.

In most of cases, if a predetermined time passes, the packet information registered in the ACL is automatically deleted, and then, if another attack packet is detected, information on the detected attack packet is registered in the ACL.

For an example, in a security system connected to a network, a threshold-based detecting/blocking scheme is usually used to block a User Datagram Protocol/Internet Control Message Protocol (UDP/ICMP) flooding attack. According to this scheme, when the UDP/ICMP flooding attack starts and thus the number of UDP/ICMP packets input to the security system increases and finally exceeds a threshold value that is preset in the security system to protect a service system, UDP/ICMP packets, which are input after the number of UDP/ICMP packets reaches the threshold value, are blocked.

At this time, in order to compare the threshold value with the number of UDP/ICMP packets, the number of UDP/ICMP packets input to the security system during a certain operating period, e.g., 1 second, is counted. As a result, if the number of UDP/ICMP packets input during the certain operating period exceeds the threshold value, UDP/ICMP packets, which are input to the security system after the number of UDP/ICMP packets reaches the threshold value, are blocked. After that, in the next operating period, the number of UDP/ICMP packets input to the security system is counted again.

After all, in the eyes of the security system, the occurrence of a situation in which the number of UDP/ICMP packets exceeds the threshold value means that most of packets input thereto are attack packets. In the eyes of the service system to be protected, it means that the service system continuously consumes service resources to process attack packets whose number is less than the threshold value every operating period.

In order to reduce the unnecessary consumption of service resources, the security system should perform an operation of reducing attack packets from a next operating period after the number of attack packets exceeds the threshold value. For this purpose, the security system registers in the ACL information on packets at a point of time in which the number of packets exceeds the threshold value, and blocks in advance packets having information that is the same as the packet information registered in the ACL. In this case, a blocking time is set to a fixed time, e.g., 10 minutes, and thus, if the blocking time passes, information on attack packets (i.e., attack packet information) that has been registered in the ACL is automatically deleted from the ACL.

If the service attack continues even after the attack packet information is deleted from the ACL, the removed attack packet information is registered in the ACL again through the above processes.

However, the conventional method of deleting the attack packet information registered in the ACL may have the following problems.

1) The damage may be caused by an attack occurring between a time of deleting the attack packet information from the ACL and a time of re-writing the attack packet information in the ACL.
2) When shortening a period of deleting the attack packet information from the ACL, the damage may increase.
3) When lengthening the period of deleting the attack packet information to avoid the above (1) and (2) problems, normal packets may be also blocked for a long time, without perfectly detecting attack packets only and registering information on the detected attack packets in the ACL.

In particular, in case of the UDP/ICMP flooding attack, since it is not guaranteed that all packets input after the number of packets exceeds the threshold value are attack packets, the above (3) problem may be more serious.

SUMMARY OF THE INVENTION

In accordance with an aspect of the present invention, there is provided an attack blocking control method using an access control list (ACL), the method including, when a packet registered in the ACL is input, checking a blocking time of the packet, checking whether or not the blocking time satisfies a predetermined blocking time renewal requirement, and automatically renewing the blocking time if the blocking time satisfies the predetermined blocking time renewal requirement.

In accordance with another aspect of the present invention, there is provided an attack blocking control method using an access control list (ACL), the method including, when a packet registered in the ACL is input, checking a blocking time of the packet, checking whether or not the blocking time satisfies a predetermined blocking cancelation requirement, and canceling the blocking for the packet if the blocking time satisfies the predetermined blocking cancelation requirement.

In accordance with still another aspect of the present invention, there is provided an attack blocking control method using an access control list (ACL), the method including investigating the ACL if a packet is input, and checking whether or not the packet is registered in the ACL, comparing a current time count value with a blocking time of the packet if the packet is determined to be registered in the ACL, increasing the number of blocking times of the packet by 1 if the current time count value is smaller than or equal to the blocking time, and automatically renewing the blocking time, and removing registration information for the packet from the ACL if the current time count value is greater than the blocking time.

In accordance with further still another aspect of the present invention, there is provided an attack blocking control apparatus using an access control list (ACL), the apparatus including a packet collecting block configured to collect packets input through a network, an information storing block configured to store the ACL where attack packet information is registered, a detecting block configured to detect whether or not the packets collected by the packet collecting block are attack packets, and register information on the packets in the ACL if the packets are determined to be the attack packets, a registration managing block configured to, when a packet registered in the ACL is input as an input packet, check a blocking time of the input packet to determine whether the blocking time satisfies a predetermined blocking time renewal requirement, and automatically renew the blocking time of the input packet when the blocking time satisfies the predetermined blocking time renewal requirement, and a blocking block configured to block the input packet when the input packet is determined to correspond to the packet registered in the ACL.

The registration managing block may be configured to automatically renew the blocking time if a current time count value of a system when the input packet is provided is smaller than or equal to the blocking time, to renew the blocking time in a direction of increasing the time, and to non-linearly increase an increase width of the blocking time as the number of blocking times for the input packet increases.

The registration managing block may be configured to check whether or not the blocking time satisfies a predetermined blocking cancelation requirement, and cancel the blocking for the input packet if the blocking time satisfies the predetermined blocking cancelation requirement.

The registration managing block may be configured to cancel the blocking for the input packet if a current time count value of a system when the input packet is provided is greater than the blocking time.

The registration managing block may include a hashing module configured to extract major information on the input packet or output an index value to notify a location of the input packet in the ACL using information extracted in advance.

In accordance with the present invention, when an input packet corresponds to a packet registered in an access control list (ACL), a current time count value is compared with a blocking time of the input packet. As a comparison result, if the current time count value is smaller than or equal to the blocking time, the number of blocking times of the input packet is incremented by 1, and the blocking time is automatically renewed. On the other hand, if the current time count value is greater than the blocking time, registered information on the input packet is deleted from the ACL, and the blocking for the input packet is canceled. Therefore, in accordance with the present invention, it is possible to effectively perform the packet blocking management by adaptively controlling a blocking time for an attack packet. In addition, it is possible to effectively prevent a normal packet from being blocked for a long time.

BRIEF DESCRIPTION OF THE DRAWINGS

The above and other objects and features of the present invention will become apparent from the following description of embodiments given in conjunction with the accompanying drawings, in which.

DETAILED DESCRIPTION OF THE EMBODIMENTS

Hereinafter, embodiments of the present invention will be described in detail. However, the present invention is not limited to the embodiments disclosed below, but can be implemented in various forms. Therefore, the following embodiments are described in order for this disclosure to be complete and enabling to those of ordinary skill in the art.

In addition, in the following description of the present invention, if the detailed description of the already known structure and operation may confuse the subject matter of the present invention, the detailed description thereof will be omitted. The following terms are terminologies defined by considering functions in the embodiments of the present invention and may be changed operators intend for the invention and practice. Hence, the terms should be defined throughout the description of the present invention.

Hereinafter, embodiments of the present invention will be described in detail with reference to the accompanying drawings.

Figure 1:
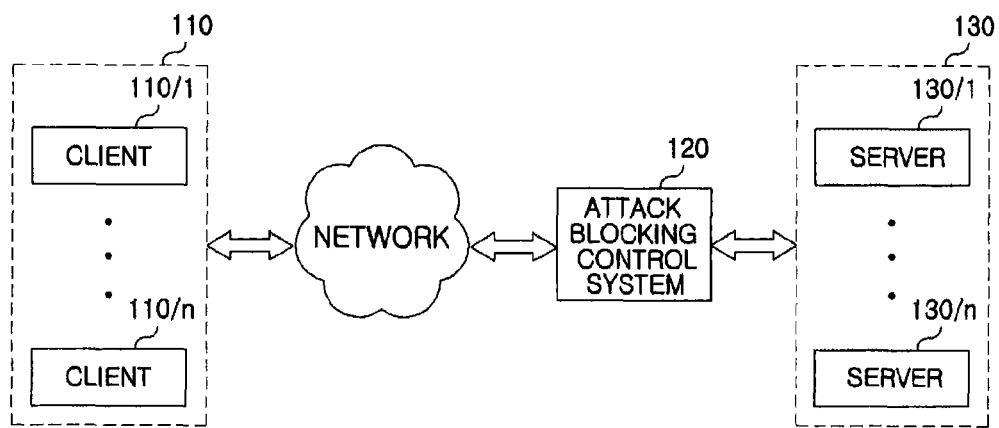
FIG. 1 is a schematic diagram for explaining a service of an attack blocking control system employing an attack blocking control device in accordance with the present invention.

FIG. 1 is a schematic diagram for explaining an attack blocking control system employing an attack blocking control device in accordance with the present invention, which may include a client group 110 having a plurality of clients 110/1 to 110/n, an attack blocking control system 120, and a server group 130 having a plurality of servers 130/1 to 130/n.

Referring to FIG. 1, each of the clients 110/1 to 110/n in the client group 110 may include a personal computer (PC), and each of the clients 110/1 to 110/n may function as a zombie PC as being infected by a malicious code. When each of the clients 110/1 to 110/n functions as a zombie PC, it continuously generates attack packets under the control of an attack program and thus can be used to execute a DDos attack on a server of an organization or a specific site through a network.

Herein, each client may be a wired or wireless client. The network may be a wired network including the Internet or a wired/wireless network complexly including the Internet and a mobile communication network such as 2G, 3G, or 4G.

The attack blocking control system 120 represents an attack blocking control device in accordance with the present invention. The inventive attack blocking control device provides a service of automatically renewing a blocking time based on a difference between a transmission interval of an attack packet and that of a normal packet or cancelling the blocking. For this purpose, the attack blocking control system 120 may have the configuration shown in FIG. 2. Detailed functions of components included in the attack blocking control system 120 will be described with reference to FIG. 2.

Each of the servers 130/1 to 130/n in the server group 130 may include a server installed in a certain site or organization. When a plurality of zombie PCs being affected by a malicious code ventures a malicious DDoS attack according to an attack program, each of the servers 130/1 to 130/n can protect itself from the malicious attack of the zombie PCs according to a scheme of blocking malicious attack packets using the attack blocking control system 120.

Figure 2:
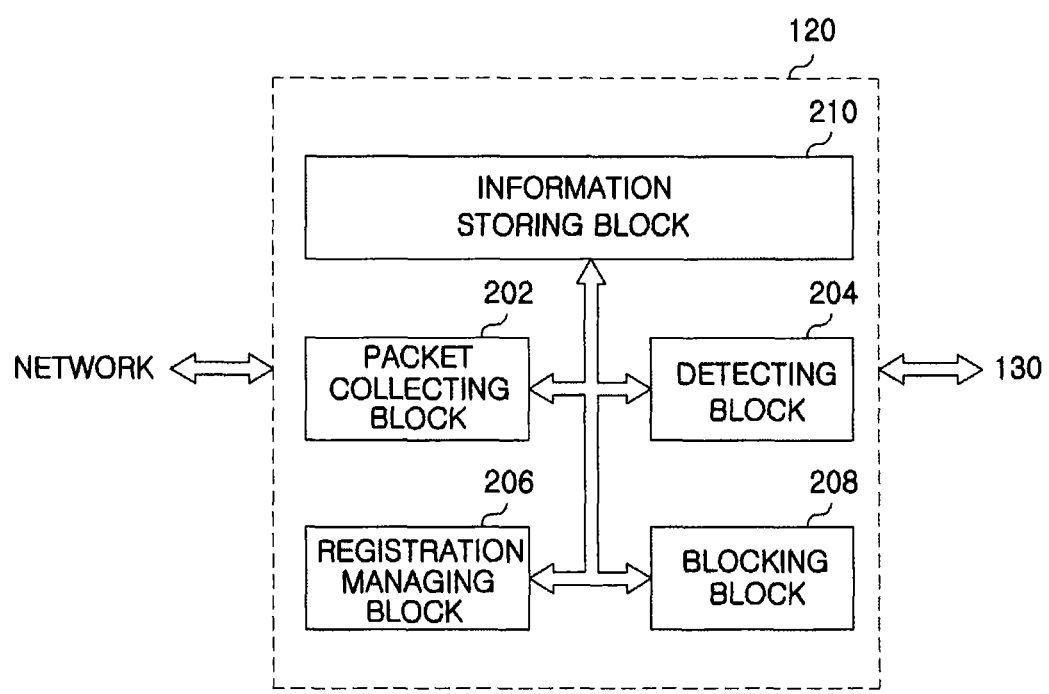
FIG. 2 illustrates a block diagram of an attack blocking control device using an access control list in accordance with the present invention.

FIG. 2 illustrates a block diagram of the attack blocking control system 120 using an access control list in accordance with the present invention. The attack blocking control system 120 may include a packet collecting block 202, a detecting block 204, a registration managing block 206, and a blocking block 208.

Referring to FIG. 2, the packet collecting block 202 collects packets input through a network and transfers the collected packets to the detecting block 204 or the registration managing block 206, wherein the collected packets may include attack packets used for a malicious attack as well as normal packets.

The detecting block 204 detects whether the collected packet transferred from the packet collecting block 202 is an attack packet or not. That is, the detecting block 204 analyses the collected packet and detects whether the collected packet is a normal packet or an attack packet. As a result, if the collected packet is determined to be the attack packet, the detecting block 204 extracts information on the attack packet, e.g., an IP address, a port number, protocol information, and so on, and registers the extracted attack packet information in an access control list (ACL) stored in an information storing block 210.

For this purpose, information on the attack packet that is detected by the detecting block 204 is registered (written) in the ACL stored in the information storing block 210. For the attack packet whose packet information is registered in the ACL, its blocking time may be automatically renewed (extended), or the registration of the attack packet information (blocking) may be canceled by the registration managing block 206 that is to be described later.

As it is well-known, the occurrence of an attack on a specific subject through the network means that there is a purpose for paralyzing services of the specific subject. In order to accomplish the purpose, an attacker system, e.g., a zombie PC, automatically transfers attack packets to the specific subject through according to an attack program.

Therefore, even though the attack packet information is registered in the ACL and thus packets corresponding to the registered attack packet information are blocked, the packets are automatically and continuously transferred to the specific subject according to the attack program. This kind of scheme is performed by the attack program regardless of whether or not a corresponding service is as the packets are blocked by the ACL.

On the other hand, if a normal user transfers packets, whenever manipulation of the user who has recognized service obstruction occurs, the packets will be transferred intermittently.

For instance, in case of an attack being generated, packet information of the normal user may be also registered in the ACL in addition to the attack packet information. In this case, both of the attack packet and the normal packet are blocked by the ACL, and thus a service corresponding to the normal packet cannot be provided.

At this time, the normal user recognizes that there is service obstruction and then manipulates its system to request the service again. As a result, it takes several seconds until a packet generated by the user's manipulation reaches the attack blocking control system, i.e., the security system.

On the other hand, the attack program automatically and continuously transmits packets to the attack blocking control system regardless of the recognition of the service obstruction, and the packets are transmitted at short intervals to heighten an effect of the attack.

Therefore, after the packet information is registered in the ACL, there exists a big time difference up to several seconds between a time interval of the packet transmitted by the attack program and a time interval of the packet normally transmitted by the manipulation of the normal user.

In accordance with an embodiment of the present invention, a scheme using the above feature of the transmission time difference is introduced. That is, according to the scheme, in case a packet corresponding to packet information registered in the ACL re-arrives in a relatively short time, there is relatively high probability that the registered packet information is attack packet information. Accordingly, a blocking time for the attack packet information registered in the ACL is automatically renewed. On the other hand, in case a packet corresponding to packet information registered in the ACL re-arrives after a relatively long time, there is relatively high probability that the registered packet information is normal packet information. Accordingly, the normal packet information registered in the ACL is automatically deleted.

For this purpose, when a packet registered in the ACL is input, the registration managing block 206 checks a blocking time of the input packet to determine whether or not the blocking time satisfies a predetermined requirement for renewing the blocking time, i.e., whether or not a current time count value of the system is smaller than or equal to the blocking time. As a result, if the blocking time satisfies the predetermined requirement for renewing the blocking time, the blocking time of the input packet is automatically renewed. Or, it is determined whether or not the blocking time of the input packet satisfies a predetermined requirement for canceling the blocking, i.e., whether the current time count value of the system is greater than the blocking time. As a result, if the blocking time satisfies the predetermined requirement for canceling the blocking, the blocking for the input packet is canceled. In order to perform the above functions, the registration managing block 206 may include a hashing module that extracts major information on the input packet, e.g., an IP address, or that outputs an index value to notify a location (entry number) in the ACL using information extracted in advance. Herein, an entry having a blocking time of 0 represents a state of being unregistered in the ACL. If the blocking time is greater than 0, it represents a state of being registered in the ACL.

Figure 4:
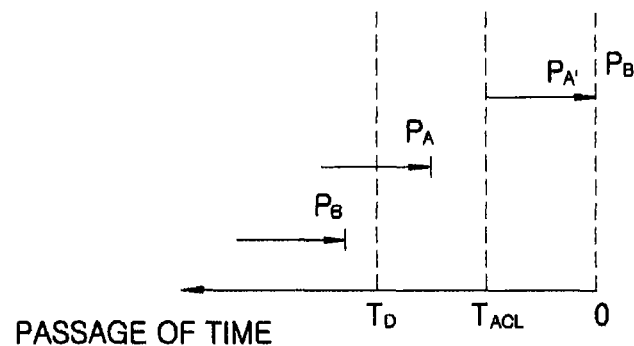
FIG. 4 is a timing diagram illustrating a process of cancelling the blocking or automatically extending a blocking time using a difference of transmission intervals in accordance with the present invention.

For instance, as shown in FIG. 4, when packets $P_A$ and $P_B$ are first input, if a blocking time of an index location in the ACL for the packets $P_A$ and $P_B$, which is a result obtained from the hashing module in the registration managing block 206, is 0, the packets $P_A$ and $P_B$ have not been registered in the ACL for the blocking. Accordingly, the packets $P_A$ and $P_B$ pass without being blocked by the ACL.

At this time, if both of the packets $P_A$ and $P_B$ are detected as attack packets by the detecting block 204, information on the packets $P_A$ and $P_B$, i.e., the attack packet information, is transmitted to the hashing module, and the number of blocking times, i.e., a blocking time value, and a blocking time of an index location of the ACL hashed to the attack packet information are set up in order to block the packets $P_A$ and $P_B$. A time established in the ACL is indicated by $T_{ACL}$, the established time value is calculated as shown below.

$$T_D = T_{CUR} + T_A$$

$$N_D = 0$$

Herein, $T_D$ represents a blocking time or a defense time, $N_D$ represents the number of blocking times or a defense number, $T_{CUR}$ represents a current time count value or a current time, and $T_A$ represents an additional time.

The defense time $T_D$ represents a time for which a corresponding packet is being blocked, and is compared with the current time count value $T_{CUR}$ of a time counter, which represents a current time of the system, whenever a packet registered in the ACL is input.

The additional time $T_A$ can be calculated through the use of various methods. Preferably, it is necessary to non-linearly increase the additional time $T_A$ as the number of blocking times increases. Since the large number of blocking times means that the probability that the input packet is an attack packet is high, it is preferable to block the input packet determined to be the attack packet for an extended period of time.

For instance, if a packet is input again within the blocking time and blocked, and the number of blocking times is $N_D$, the additional time $T_A$ becomes $2^{\wedge}(N_D)$, so that it is possible to non-linearly increase the additional time $T_A$.

If the packet $P_A$, which is registered in the ACL, is input again when the current time $T_{CUR}$ is smaller than or equal to the blocking time $T_D$, the probability that the packet $P_A$ is a packet automatically transmitted by the attack program is high. As a result, the packet $P_A$ is blocked, the number of blocking times $N_D$ increases by 1, and the blocking time $T_D$ is automatically renewed again in a direction of increasing the time.

On the other hand, if the packet $P_B$, which is registered in the ACL, is input again when the current time $T_{CUR}$ is greater than the blocking time $T_D$, the probability that the packet $P_B$ is a packet manually transmitted by the user's manipulation is high. As a result, the packet $P_B$ passes, the number of blocking times and a blocking time of a corresponding entry are reset for the blocking cancelation.

Referring back to FIG. 2, the blocking block 208 may provide a function of blocking an attack packet in response to a blocking control instruction transmitted from the registration managing block 206. That is, the blocking block 208 blocks an input packet when it is detected that a packet registered in the ACL is input.

Hereinafter, there will be described a sequence of processes of automatically renewing a blocking time of an attack packet or cancelling the blocking based on a difference between a transmission interval of an attack packet and a transmission interval of a normal packet using an attack blocking control system having the above-described configuration in accordance with the present invention.

Figure 3:
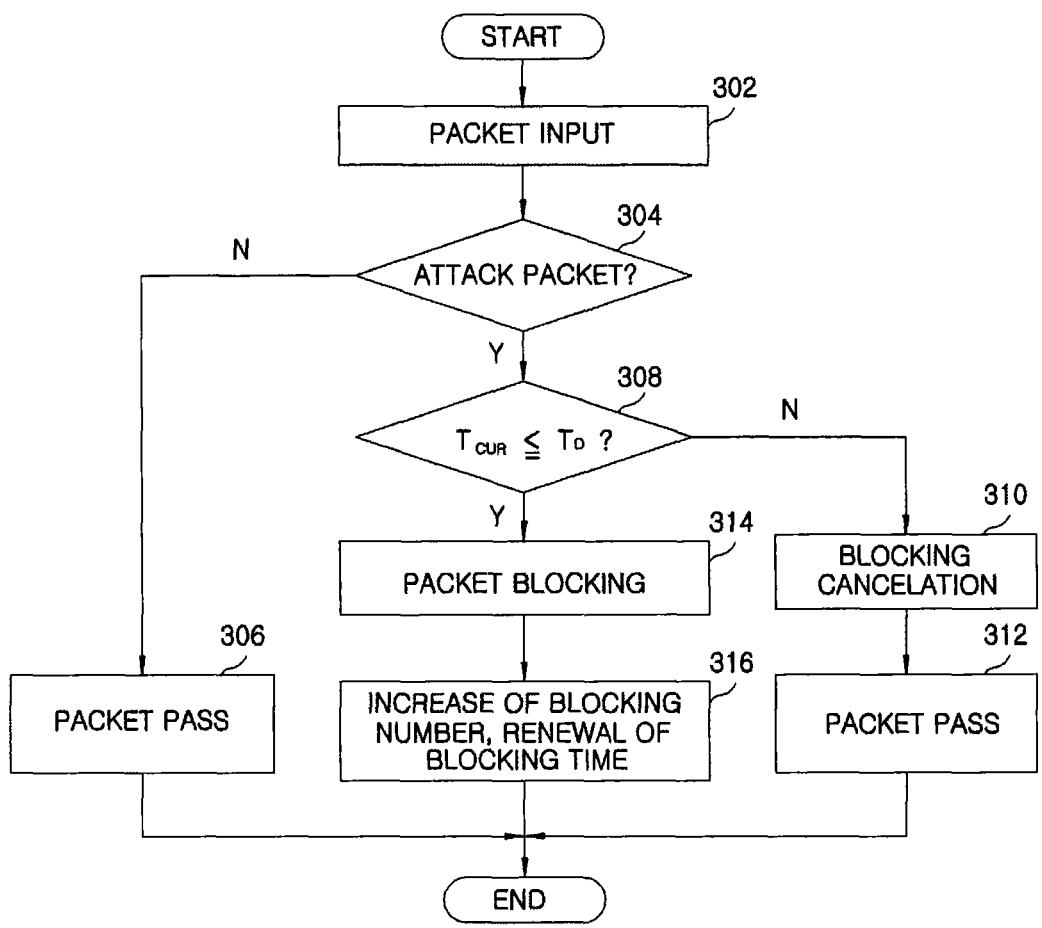
FIG. 3 is a flowchart illustrating major processes of adaptively performing the attack blocking control using an access control list in accordance with the present invention.

FIG. 3 is a flowchart illustrating major processes of adaptively performing the attack blocking control using an access control list in accordance with the present invention.

First of all, if a packet is input through a network, the detecting block 204 detects whether the input packet that is collected and transmitted by the collecting block 202 is an attack packet. That is, the detecting block 204 analyzes the input packet to detect whether the input packet is a normal packet or an attack packet. If the input packet is detected to be the normal packet, the input packet passes without being blocked. That is, the input packet is transferred to a specific subject, e.g., a server, providing a specific service.

As a result of the packet detection, if the input packet is detected to be the attack packet, the detecting block 204 extracts information on the attack packet, e.g., an IP address, a port number, protocol information, and so on, and registers the attack packet information in the ACL stored in the information storing block 210. Herein, for the simplicity of explanation and the improvement of understanding, it is assumed that a plurality of packets is detected to be attack packets and information on the plurality of packets is registered in the ACL in the information storing block 210.

Referring to FIG. 3, if a packet is input through the network and the packet collecting lock 202 in step 302, the registration managing block 206 checks whether or not the input packet is an attack packet registered in the ACL in step 304.

As a checking result in step 304, if the input packet is determined to be a normal packet, the input packet passes without being blocked. That is, the input packet is transferred to a specific subject, e.g., a server, providing a specific service in step 306.

As the checking result in step 304, if the input packet is determined to be the attack packet registered in the ACL, the registration managing block 206 withdraws a blocking time $T_D$ of the input packet from the information storing block 210 and then checks whether a current time count value $T_{CUR}$ of the system is smaller than or equal to the blocking time of the input packet (predetermined blocking time renewal requirement) or greater than the blocking time (predetermined blocking cancelation requirement) in step 308.

As a checking result in step 308, if the time count value $T_{CUR}$ is greater than the blocking time, i.e., satisfies the predetermined blocking cancelation requirement, the registration managing block 206 removes the packet information on the input packet from the ACL in the information storing block 210 and clears the blocking time and the number of blocking times of the input packet in step 310. As a result, the input packet is processed as the normal packet and thus transferred to the specific subject providing the specific service in step 312.

As the checking result in step 308, if the time count value $T_{CUR}$ is smaller than or equal to the blocking time of the input packet, i.e., satisfies the predetermined blocking time renewal requirement, the transmission of the input packet is blocked in step 314. The registration managing block 206 automatically renews the blocking time of the input packet in a direction of increasing the time and increases the number of blocking times by 1 in step 316.

Herein, the automatically renewed blocking time and the number of blocking times increased by 1 are stored in the information storing block 210. In accordance with the present invention, as the number of blocking times for a packet through the above processes increases, a blocking time of the packet is non-linearly increased.

Meanwhile, the combinations of each block of the accompanying block diagram and each step of the accompanying flowchart may be performed by computer program instructions. These computer program instructions may be loaded on a processor of a general-purpose computer, a special-purpose computer, or other programmable data processing equipments. Therefore, the instructions performed by the processor of the computers or other programmable data processing equipments generate units for performing functions explained in each step of the flowchart or each block of the block diagram. Since the computer program instructions can be stored in a computer usable memory or a computer readable memory to be employed in a computer or other programmable data processing equipments to implement functions of the instructions in a specific manner, the instructions stored in the computer usable memory or the computer readable memory can be manufactured as products employing an instruction unit for performing functions explained in each step of the flowchart or each block of the block diagram.

Since the computer program instructions can be loaded on the computer or other programmable data processing equipments, a sequence of operating steps is performed on the computer or other programmable data processing equipments to generate a process performed by the computer. Therefore, the instructions processed by the computer or other programmable data processing equipments can provide steps of performing the functions explained in each step of the flowchart and each block of the block diagram.

In addition, each block or each step may represent a part of a module, a segment, or a code including at least one executable instruction for performing specific logical function(s). In accordance with other embodiments, it is noted that the functions mentions in the blocks or steps can be performed regardless of their order. For instance, two blocks or steps illustrated sequentially can be simultaneously performed or the blocks or steps can be performed in reverse order according to their functions.

While the invention has been shown and described with respect to the preferred embodiments, the present invention is not limited thereto. It will be understood by those skilled in the art that various changes and modifications may be made without departing from the scope of the invention as defined in the following claims.

What is claimed is:

1. An attack blocking control method using an access control list (ACL), the method comprising:
   when a packet registered in the ACL is input, checking a blocking time of the packet using a processor;
   checking whether or not the blocking time satisfies a predetermined blocking time renewal requirement; and
   automatically renewing the blocking time if the blocking time satisfies the predetermined blocking time renewal requirement.

2. The method of claim 1, wherein the predetermined blocking time renewal requirement includes a requirement that a current time count value of a system when the packet is input is smaller than or equal to the blocking time.

3. The method of claim 1, wherein the automatically renewing of the blocking time includes automatically renewing the blocking time in a direction of increasing the time.

4. The method of claim 3, wherein an increase width of the automatic renewal for the blocking time non-linearly rises as the number of blocking times for the packet increases.

5. An attack blocking control method using an access control list (ACL), the method comprising:
   when a packet registered in the ACL is input, checking a blocking time of the packet using a processor;
   checking whether or not the blocking time satisfies a predetermined blocking cancelation requirement; and
   canceling the blocking for the packet if the blocking time satisfies the predetermined blocking cancelation requirement.

6. The method of claim 5, wherein the predetermined blocking cancelation requirement includes a requirement that a current time count value of a system when the packet is input is greater than the blocking time.

7. An attack blocking control apparatus using an access control list (ACL), the apparatus comprising:
   a packet collecting block configured to collect packets input through a network;
   an information storing block configured to store the ACL where attack packet information is registered;
   a detecting block configured to detect whether or not the packets collected by the packet collecting block are attack packets, and register information on the packets in the ACL if the packets are determined to be the attack packets;
   a registration managing block configured to, when a packet registered in the ACL is input as an input packet, check a blocking time of the input packet to determine whether the blocking time satisfies a predetermined blocking time renewal requirement, and automatically renew the blocking time of the input packet when the blocking time satisfies the predetermined blocking time renewal requirement; and
   a blocking block configured to block the input packet when the input packet is determined to correspond to the packet registered in the ACL.

8. The apparatus of claim 7, wherein the registration managing block is configured to automatically renew the blocking time if a current time count value of a system when the input packet is provided is smaller than or equal to the blocking time.

9. The apparatus of claim 8, wherein the registration managing block is configured to renew the blocking time in a direction of increasing the time.

10. The apparatus of claim 9, wherein the registration managing block is configured to non-linearly increase an increase width of the blocking time as the number of blocking times for the input packet increases.

11. The apparatus of claim 7, wherein the registration managing block is configured to check whether or not the blocking time satisfies a predetermined blocking cancelation requirement, and cancel the blocking for the input packet if the blocking time satisfies the predetermined blocking cancelation requirement.

12. The apparatus of claim 11, wherein the registration managing block is configured to cancel the blocking for the input packet if a current time count value of a system when the input packet is provided is greater than the blocking time.

13. The apparatus of claim 7, wherein the registration managing block includes a hashing module configured to extract major information on the input packet or output an index value to notify a location of the input packet in the ACL using information extracted in advance.

* * * * *